US006952730B1

(12) United States Patent
Najork et al.

(10) Patent No.: US 6,952,730 B1
(45) Date of Patent: Oct. 4, 2005

(54) SYSTEM AND METHOD FOR EFFICIENT FILTERING OF DATA SET ADDRESSES IN A WEB CRAWLER

(75) Inventors: Marc Alexander Najork, Palo Alto, CA (US); Clark Allan Heydon, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 677 days.

(21) Appl. No.: 09/607,710

(22) Filed: Jun. 30, 2000

(51) Int. Cl.[7] .............................................. G06F 13/00
(52) U.S. Cl. ...................... 709/225; 709/217; 709/219; 709/224
(58) Field of Search ............................... 709/223–225, 709/226, 220, 204, 200–203, 217–219

(56) References Cited

U.S. PATENT DOCUMENTS

| | | | | |
|---|---|---|---|---|
| 5,564,037 A | * | 10/1996 | Lam | 711/161 |
| 5,893,086 A | * | 4/1999 | Schmuck et al. | 707/1 |
| 5,913,208 A | * | 6/1999 | Brown et al. | 707/3 |
| 5,953,729 A | * | 9/1999 | Cabrera et al. | 707/204 |
| 5,974,455 A | * | 10/1999 | Monier | 709/223 |
| 6,094,649 A | * | 7/2000 | Bowen et al. | 707/3 |
| 6,301,614 B1 | * | 10/2001 | Najork et al. | 709/223 |
| 6,321,265 B1 | * | 11/2001 | Najork et al. | 709/224 |
| 6,490,658 B1 | * | 12/2002 | Ahmed et al. | 711/140 |
| 6,547,829 B1 | * | 4/2003 | Meyerzon et al. | 715/501.1 |

OTHER PUBLICATIONS

Brin and Page, The Anatomy of a Large-Scale Hypertextual Web Search Engine, Database (Online), Available Web Site: http://www7.scu.edu.au/programme/fullpapers/1921/com1921.htm Last Update: Feb. 3, 2000.
Heydon and Najork, Mercator: A Scalable, Extensible Web Crawler, [No Info].

* cited by examiner

Primary Examiner—Moustafa M. Meky

(57) ABSTRACT

A web crawler stores fixed length representations of document addresses in a buffer and a disk file, and optionally in a cache. When the web crawler downloads a document from a host computer, it identifies URL's (document addresses) in the downloaded document. Each identified URL is converted into a fixed size numerical representation. The numerical representation may optionally be systematically compared to the contents of a cache containing web sites which are likely to be found during the web crawl, for example previously visited web sites. The numerical representation is then systematically compared to numerical representations in the buffer, which stores numerical representations of recently-identified URL's. If the representation is not found in the buffer, it is stored in the buffer. When the buffer is full, it is ordered and then merged with numerical representations stored, in order, in the disk file. In addition, the document corresponding to each representation not found in the disk file during the merge is scheduled for downloading. The disk file may be a sparse file, indexed to correspond to the numerical representations of the URL's, so that only a relatively small fraction of the disk file must be searched and re-written in order to merge each numerical representation in the buffer.

64 Claims, 11 Drawing Sheets

SYSTEM AND METHOD FOR EFFICIENT FILTERING OF DATA SET ADDRESSES IN A WEB CRAWLER

FIELD OF THE INVENTION

The present invention relates to a system and method for filtering document addresses in a web crawler and, more particularly, to a method for efficiently filtering the addresses of downloaded documents to avoid downloading from duplicate addresses.

BACKGROUND OF THE INVENTION

Documents on interconnected computer networks are typically stored on numerous host computers that are connected over the networks. For example, so-called "web pages" may be stored on the global computer network known as the Internet, which includes the world wide web. Web pages can also be stored on Intranets, which are typically private networks maintained by corporations, government entities, and other groups. Each web page, whether on the world wide web or an Intranet, has a distinct address called its uniform resource locator (URL), which at least in part identifies the location or host computer of the web page. Many of the documents on Intranets and the world wide web are written in standard document description languages (e.g., HTML, XML). Theses languages allow an author of a document to create hypertext links to other documents. Hypertext links allow a reader of a web page to access other web pages by clicking on links to the other pages. These links are typically highlighted in the original web page. A web page containing hypertext links to other web pages generally refers to those pages by their URL's. A URL may be referred to more generally as a data set address, which corresponds to a web page, or data set. Links in a web page may refer to web pages that are stored in the same or different host computers.

A web crawler is a program that automatically finds and downloads documents from host computers in an Intranet or the world wide web. A computer with a web crawler installed on it may also be referred to as a web crawler. When a web crawler is given a set of starting URL's, the web crawler downloads the corresponding documents. The web crawler then extracts any URL's contained in those downloaded documents. Before the web crawler downloads the documents associated with the newly discovered URL's, the web crawler needs to find out whether these documents have already been downloaded. If the documents associated with the newly discovered URL's have not been downloaded, the web crawler downloads the documents and extracts any URL's contained in them. This process repeats indefinitely or until a predetermined stop condition occurs.

Typically, to find out whether the documents associated with a set of discovered URL's have already been downloaded or are scheduled to be downloaded, the web crawler checks a directory of document addresses. These document addresses are URL's that correspond to documents which have either already been downloaded or are scheduled to be downloaded; for convenience, these documents will be referred to as downloaded documents. The directory stores the URL's of the downloaded documents, or representations of the URL's. The set of URL's in downloaded documents could potentially contain addresses of every document on the world wide web. As of 1999 there were approximately 800 million web pages on the world wide web and the number is continuously growing. Even Intranets can store millions of web pages. Thus, web crawlers need efficient data structures to keep track of downloaded documents and any discovered addresses of documents to be downloaded. Such data structures are needed to facilitate fast data checking and to avoid downloading a document multiple times.

Typically, the set of downloaded document addresses is stored in disk storage, which has relatively slow access time. One example of a method designed to facilitate fast data checking and to avoid downloading a document multiple times is disclosed in U.S. patent application Ser. No. 09/433,008, filed Nov. 2, 1999. That document discloses storing address representations on disk, and using an efficient address representation to facilitate fast look-up of document addresses stored on disk. The present invention provides improved storage methods, decreasing the frequency with which disk storage must be accessed.

SUMMARY OF THE INVENTION

The present invention provides efficient address filtering operations for a web crawler by storing representations of recently-identified URL'S, typically a checksum or "fingerprint," in a buffer in main memory, rather than on disk. A representation of a URL is added to the buffer only when it is not already stored in the buffer. The buffer is merged with a disk file only when the buffer is full. Thus, the disk is accessed only when the buffer is full, and not every time a URL is identified by the web crawler while processing a downloaded document.

During the merge, items in the buffer not found in the disk file are identified and the corresponding URL's are queued for downloading by the web crawler.

The present application is applicable to both Internet and Intranet web crawlers.

In one embodiment, a cache for storing "popular" URL's is maintained in memory in addition to the buffer. Each identified URL is compared with entries in the cache and entries in the buffer, and is added to the buffer only when it is not in either the cache or buffer. Use of the cache reduces the rate at which the buffer is filled with fingerprints, which reduces the frequency of merges with the disk file.

In some embodiments the disk file is a sparse file, having empty entries interspersed among the non-empty entries, using open-addressing. Thus, during a merge, the number of writes to the disk is one for each representation in the buffer that is not already present in the disk file, which increases the efficiency of the merge operation. In some embodiments, the disk file is divided into sparse sub-files, which further increases the efficiency of the merge operation. Efficient address representations may be used, increasing the efficiency of the merge operation, particularly in the case where URLs on a given web page have a high degree of locality.

Additional features of various embodiments of the invention are described in the detailed description of the invention provided below.

DETAILED DESCRIPTION OF EXEMPLARY EMBODIMENTS

Figure 1:
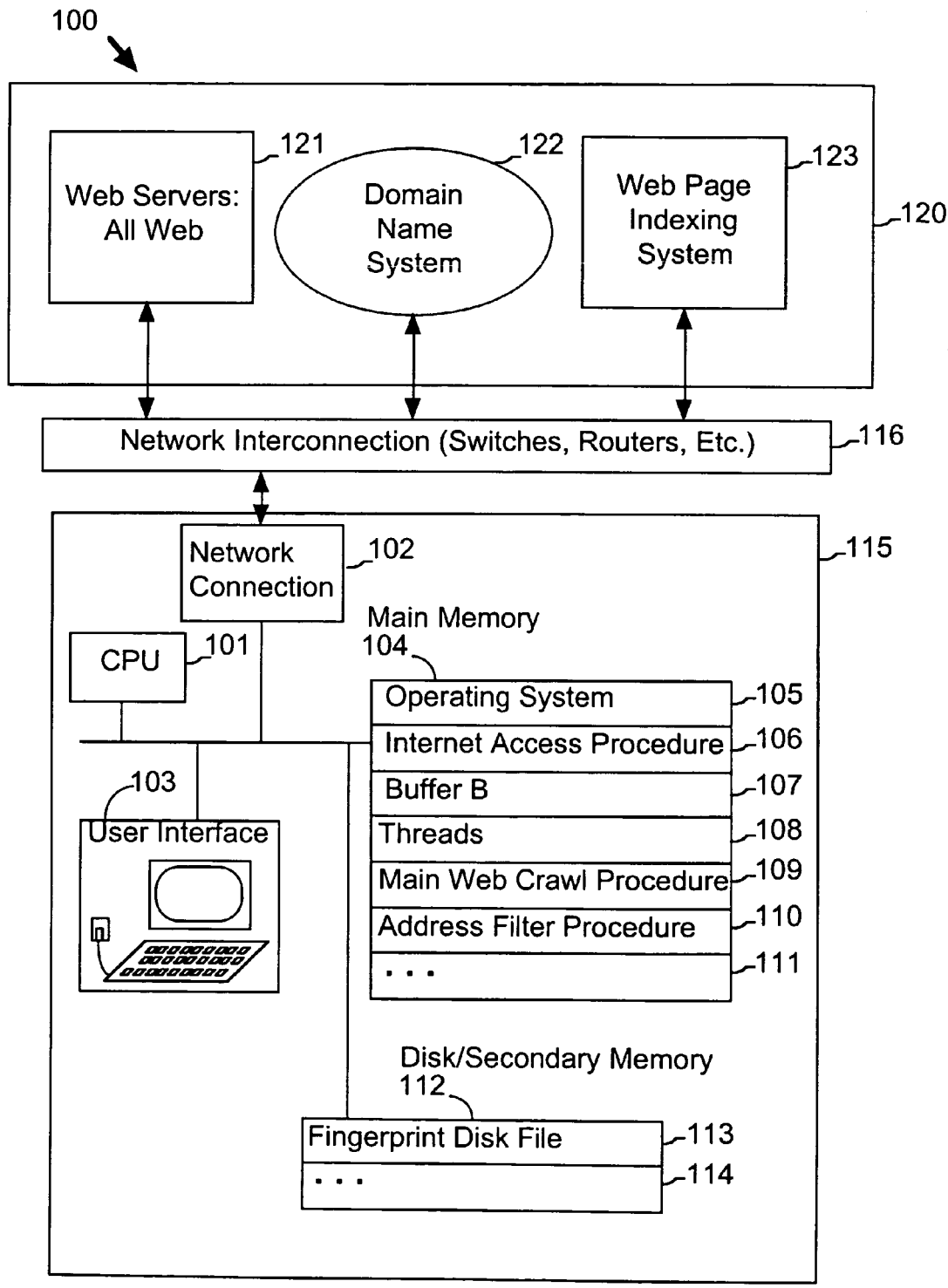
FIG. 1 is a block diagram of a system network in accordance with an embodiment of the invention.

FIG. 1 shows an exemplary embodiment of a distributed computer system 100. The distributed computer system 100 includes a web crawler 115 connected to a network 120 through a network interconnection 116. The network 120 may be a global communication network, such as the Internet, or a private network, sometimes called an Intranet. Examples of network interconnection 116 includes switches, routers, etc.

The Internet network 120 includes web servers 121 and a service known as a domain name system 122. It may also optionally include a web page indexing system 123. The web servers 121 store web pages. The domain name system 122 is a distributed database that provides the mapping between Internet Protocol (IP) addresses and host names. The domain name system 122 is a distributed system because no single site on the Internet has the domain name mapping information for all the web servers in the network. Each site participating in the domain name system 122 maintains its own database of information and runs a server program that other systems across the Intranet or Internet can query. The domain name system provides the protocol that allows clients and servers to communicate with each other. Any application may look up the IP address (or addresses) corresponding to a given host name or the host name corresponding to a given IP address in the domain name system 122. An application accesses the domain name system 122 through a resolver. The resolver contacts one or more name servers to perform a mapping of a host name to the corresponding IP address, or vice versa. A given host name may be associated with more than one IP address because an Intranet or Internet host may have multiple interfaces, with each interface of the host having a unique IP address.

The web page indexing system 123 includes an index of words used on the world wide web and addresses of the web pages that use each word. Such indexing systems are maintained by various search engines, such as the AltaVista search engine. The domain name system 122 and the web page indexing system 123 may be accessed by the web crawler 115 in the process of downloading web pages from the world wide web.

The web crawler 115 includes a communications interface, or network connection, 102, one or more CPUs 101, an operator interface 103 (which may be remotely located on another computer), primary or main memory 104 and secondary (e.g. disk) memory 112. In an exemplary embodiment, the network connection 102 is able to handle overlapping communication requests. The memory 104 includes:

- a multitasking operating system 105;
- an Intranet/Internet access procedure 106 for fetching web pages as well as communicating with the domain name system 122;
- a fixed size buffer B 107 for storing recently added numerical representations of URL's, and optionally the URL's themselves;
- an optional second fixed size buffer B' (not shown) for storing recently-added numerical representations of URL's, and optionally the URL's as well, when buffer B 107 is being merged with disk file 113;
- an optional cache C (not shown) for storing "popular" URL's;
- threads 108 for downloading web pages from the servers 121, and processing the downloaded web pages;
- a main web crawler procedure 109 executed by each of the threads 108; and
- a URL address filtering procedure 110 executed by each of the threads 108 to filter the URL's identified in a downloaded web page, and determine which URL's are new and therefore should be scheduled for downloading.

Buffer B 107, optional buffer B' and optional cache C are preferably implemented in main memory as hash tables to facilitate fast lookup operations.

A fingerprint disk file 113, which is not bounded in size, is stored in secondary disk storage 112. A second URL disk file, not shown, may also be stored in disk storage 112. The buffers B and B', cache C and the fingerprint disk file 113 store a numerical representation, or "fingerprint," of each URL known to the web crawler. The fingerprint of a URL may be generated using an appropriate function, such as a function that employs one or more checksum functions. The buffers may additionally store the actual address, or URL, corresponding to each stored fingerprint. Alternatively, in a preferred embodiment, the addresses corresponding to the fingerprints in a buffer may be stored in the optional URL disk file instead of in a buffer.

Main Web Crawler Procedure

In the exemplary embodiment the web crawler uses multiple threads to download and process documents. The web crawler 115 is given a set of initial URL's and begins downloading documents using those URL's. Various data structures may be used to keep track of which documents (web pages) the threads should download and process, but those particular data structures are not the subject of the present document. Rather, the present invention concerns the data structures used to keep track of the URL's of documents that have been downloaded or may be scheduled for downloading and to ensure that duplicate URL's are not scheduled for downloading.

Figure 2:
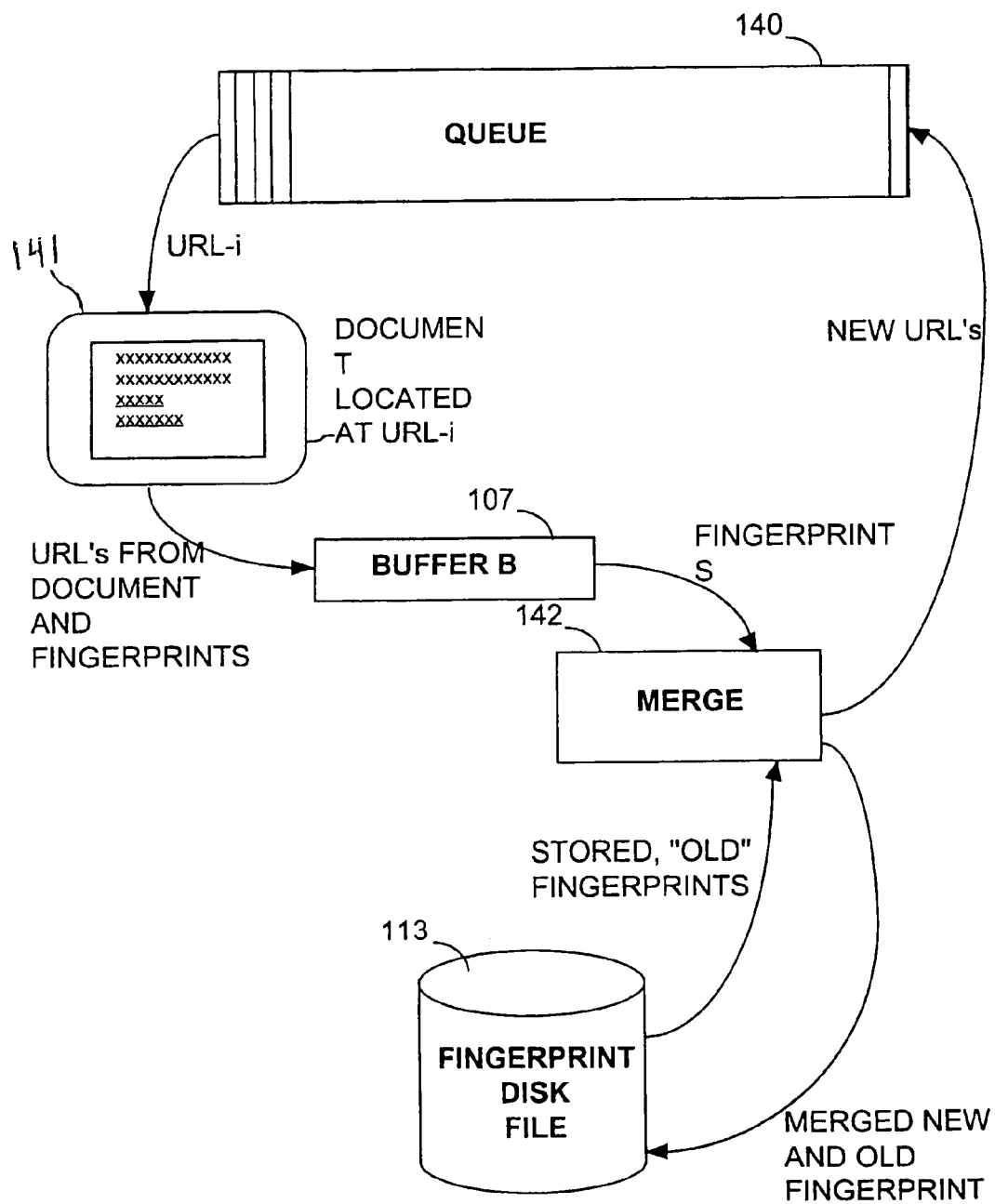
FIG. 2 is a block diagram of the data flow in an embodiment of the invention.
Figure 3:
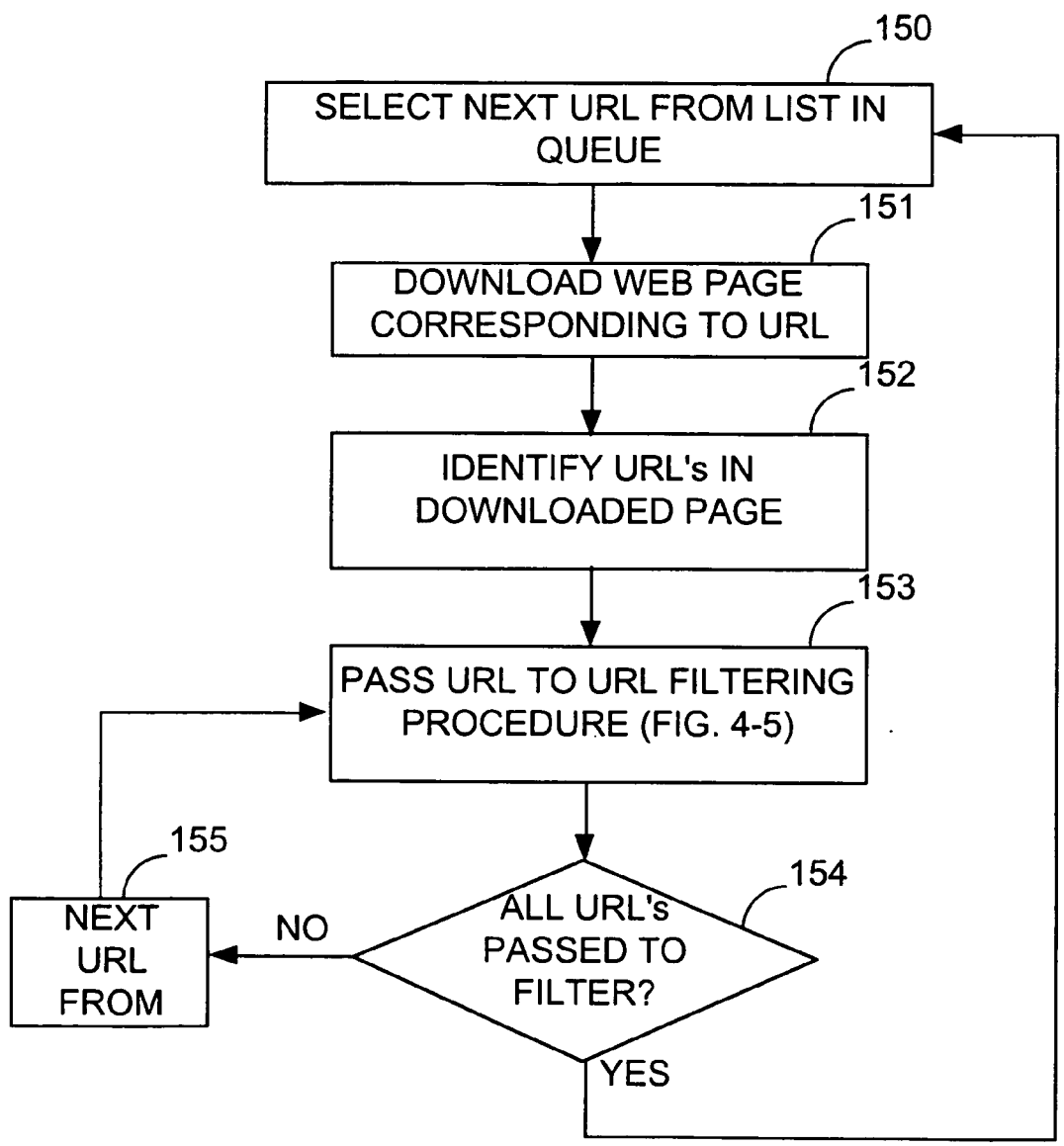
FIG. 3 is a flow chart of a main web crawling procedure executed by each of a plurality of threads in an exemplary embodiment of the invention.

Each thread executes a main web crawler procedure 109, which will be now described with reference to the diagram shown in FIG. 2 and the flow chart shown in FIG. 3. The web crawler thread determines the data set address, URL-i, of the next document, or data set, to be downloaded, typically by retrieving it from a queue data structure 140 (step 150). The thread then downloads the document 141 corresponding to the URL (step 151), and processes the document. The processing may include indexing the words in the document so as to make the document accessible via a search engine. However, the only processing of the document that is relevant to the present discussion is that the main procedure identifies URL's in the downloaded document 141 (step 152) that are candidates for downloading and processing. Typically, these URL's are found in hypertext links in the document 141 being processed.

Each identified URL is passed to the address filtering procedure in step 153 to determine if it is the URL for a page already known to the web crawler, or is a "new URL" for a document not previously known to the web crawler. If that procedure determines that the identified URL is already known to the web crawler, the URL is discarded and is not scheduled for downloading. If the identified URL is not known, it is ultimately added to the queue 140 of URL's scheduled for downloading. In the meantime, the main procedure continues to identify URL's and pass URL's to the address filtering procedure until all URL's from the downloaded page have been processed (steps 154–155). When all URL's have been passed to the address filtering procedure, the next address in the queue 140 is downloaded (step 150).

Address Filtering Procedure

Figure 4:
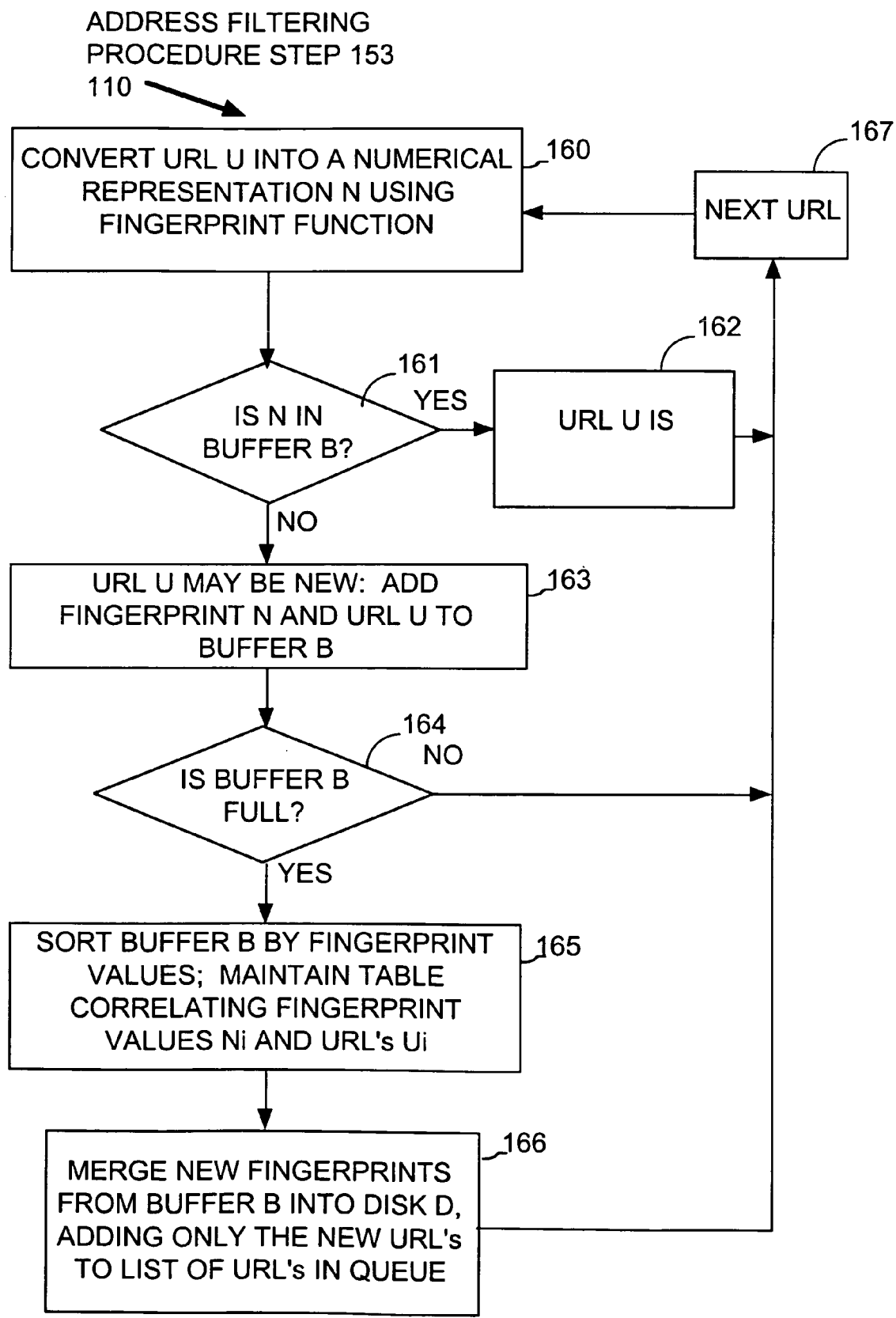
FIG. 4 is a flow chart of an address filtering procedure used in an exemplary embodiment of the invention.
Figure 5:
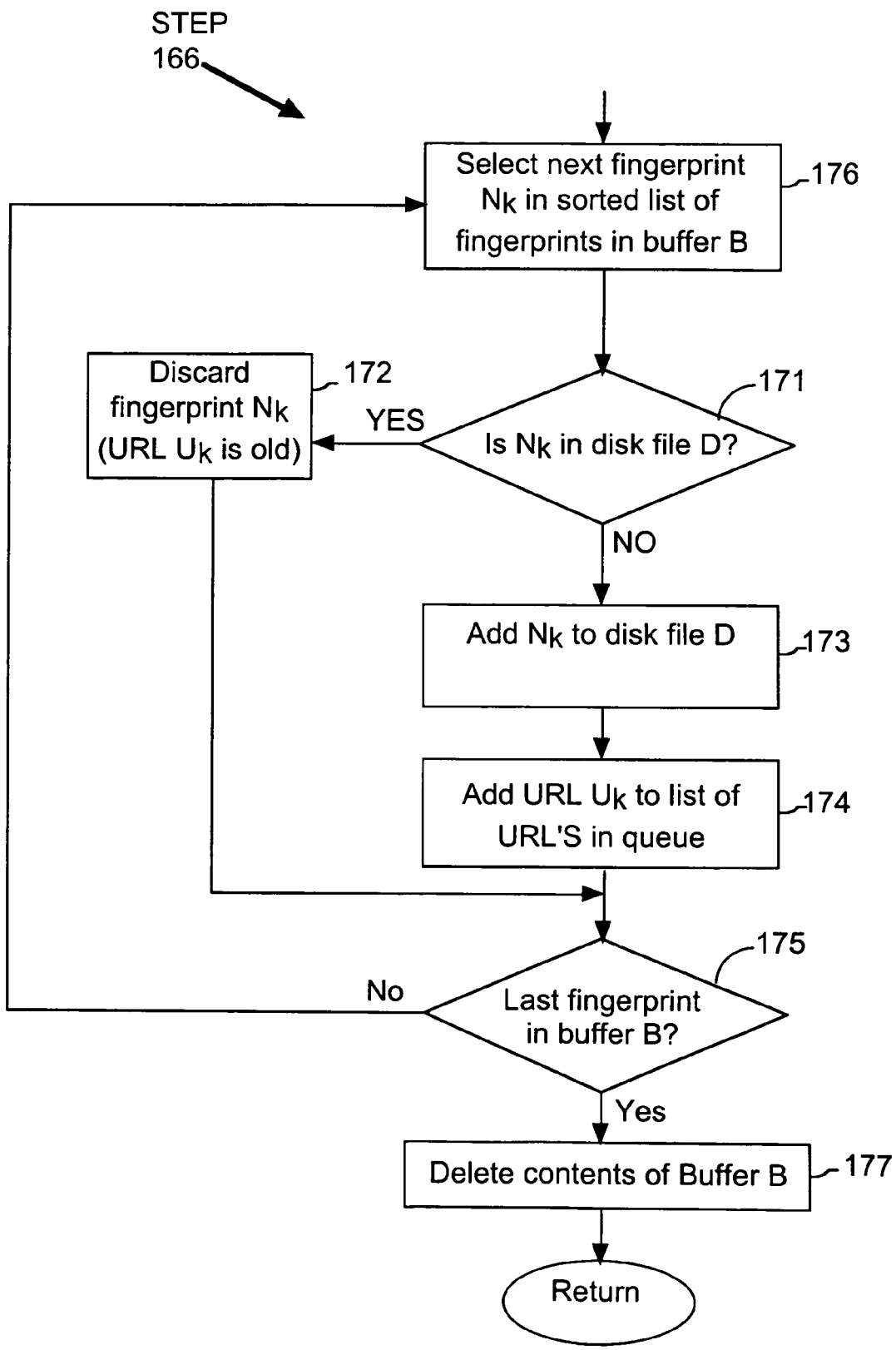
FIG. 5 is a flow chart of the merge process used by the address filtering procedure in an exemplary embodiment of the invention.

An exemplary embodiment of the address filtering procedure (also herein called the address filter) invoked by the main web crawler procedure is described next with reference to the diagram shown in FIG. 2 and the flow chart shown in FIGS. 4 and 5. The first step of the URL processing procedure is to convert a specified URL into a fixed length numeric representation, or "fingerprint," (step 160), by applying a predefined checksum function (for example, without limitation, a checksum fingerprint function), or set of checksum functions, to the URL. The fingerprint disk file 113 stores fingerprints of URL's instead of storing the corresponding URL's. The buffer B 107 also stores fingerprints, and additionally stores the corresponding URL's as well. Many suitable fingerprint functions are known to those skilled in the art, and thus are not described here.

After the specified URL U has been converted into a numeric representation N, a lookup is performed to see if N is already stored in buffer B 107 (step 161), which stores the fingerprints of recently added URL's, as well as the corresponding URL's. If N is already stored in buffer B 107, it has already been scheduled for downloading, and therefore no further processing of the URL U is needed. If N is not stored in buffer B 107, it may be new (although it may already be stored in the fingerprint disk file 113), and therefore N and the corresponding URL U are added to buffer B 107 (step 163). The address filter continues to process URL's (step 167) until buffer B 107 is full.

If the buffer B 107 is full (step 164), it must be merged with the fingerprint disk file 113 (step 166). The buffer B 107 is first sorted (step 165) so that the fingerprints are in order. After ordering, the buffer B 107 is then merged with the fingerprint disk file 113, where only fingerprints corresponding to new URL's are added to the disk file 113. As shown in FIG. 5, during the merge, the fingerprint disk file 113 is searched to determine whether a fingerprint $N_k$ is located in the disk file (step 171). If so, fingerprint $N_k$ is ignored. If not, the fingerprint is added to the disk file 113, and the corresponding URL is added to the queue for downloading of the corresponding web page document in step 174. If there are more fingerprints in buffer B (step 175), the next fingerprint in buffer B 107 is processed (step 176). When the merge process is completed, the contents of buffer B 107 are deleted (step 177). The process of merging buffer B 107 into the disk file 113 is a relatively time-consuming operation. Therefore buffer B 107 is typically made fairly large so as to minimize the frequency of such merge operations.

Figure 6:
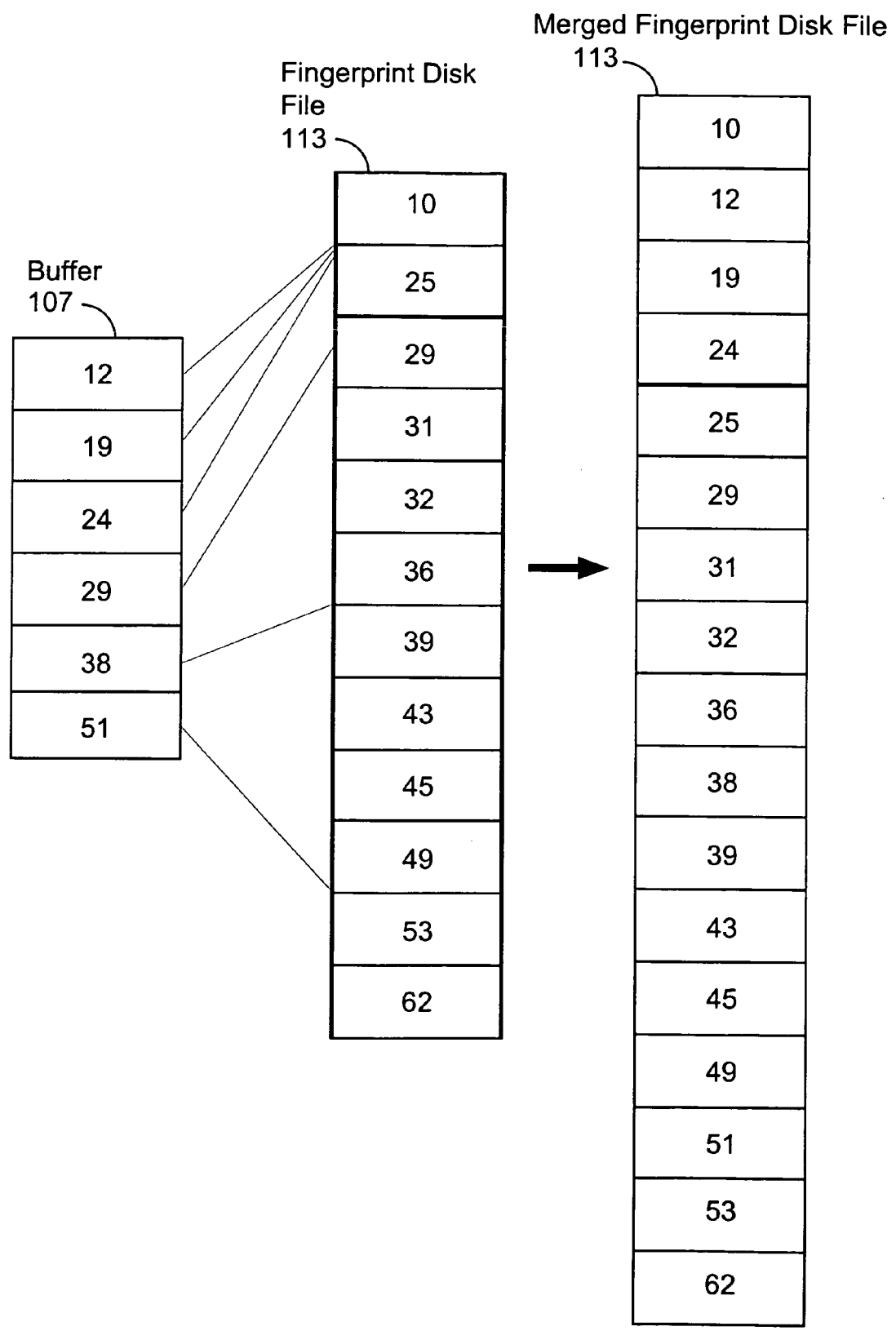
FIG. 6 is a block diagram of data structures used in accordance with an embodiment of the invention.

During the merge process, which is an ordered merge, fingerprint $N_k$ must be inserted in the fingerprint disk file 113 in the proper location, as illustrated in FIG. 6, so that the disk file 113 remains ordered. This requires the disk file to be completely re-written. To avoid this lengthy rewrite process, in a preferred embodiment, the fingerprint disk file may be sparsely-filled, using open addressing. For this embodiment, the fingerprint disk file represents a hash table, with a substantial proportion of the table, for example 50% or 75%, being empty entries, or "holes."

In this embodiment, in order to determine whether a particular fingerprint $N_k$ is in the disk file, the hash of the fingerprint is computed. In one embodiment, only a prefix of the fingerprint is used for the hash value. The hash value is the starting position for searching through the fingerprint disk file. The disk file is searched sequentially, starting at the starting position, for either a match or a hole. If a hole is found, the fingerprint $N_k$ is stored in that hole; if a match is found, $N_k$ is discarded. Thus, there is only one write to the disk file for each fingerprint not already present in the disk file, and the size of the disk file is not a factor in the merge time. When the disk file becomes too full—for example, when only 25% of the slots in the disk file are holes—the file must be completely rewritten into a new, larger file. For example, the new file may be doubled in size, in which case the amortized cost of maintaining the file is constant per fingerprint in the hash table. It will be appreciated that the use of open addressing a sparsely-filled disk file drastically reduces the disk re-writing required during a merge.

In one embodiment, the disk file may be divided into sparse sub-files, with open-addressing used for each sub-file. An index may be used to identify the range of fingerprint hash values located in each sub-file, or an additional hash table may be used to map fingerprints to the various sub-files. When a sub-file becomes too full, it may be re-written into a new, larger file, but the entire disk file need not be re-written.

In another aspect of the present invention, an efficient addressing scheme may be used for either a sparse disk file, or a disk file consisting of a set of sparse sub-files. In this addressing scheme, discussed in U.S. patent application Ser. No. 09/433,008, filed Nov. 2, 1999 (hereby incorporated by reference in its entirety), each fingerprint is composed of two components: a first fingerprint component based only upon the host component of the URL, and a second fingerprint component based upon the entire URL. A canonical representation of the host component of each URL may be used instead of the actual host component. Each fingerprint component is generated using a fingerprint function, which may differ for the two components. The fingerprint for a URL is the concatenation of these two components.

The disk file (or each sub-file) is ordered, so that all fingerprints from the same host will be likely stored in either the same sub-file, or at contiguous memory locations within the disk file. Because URL's located on a given web page often have the same host, this efficient addressing scheme can significantly improve the speed of the merge process. When a new fingerprint is to be added to the disk file during the merge, often the buffer used for the merge will already contain the disk page on which that fingerprint will be stored. This will occur when the previous fingerprint added to the disk file was from the same host as the new fingerprint, and consequently would likely have been stored on the same disk page as the new fingerprint.

Figure 7:
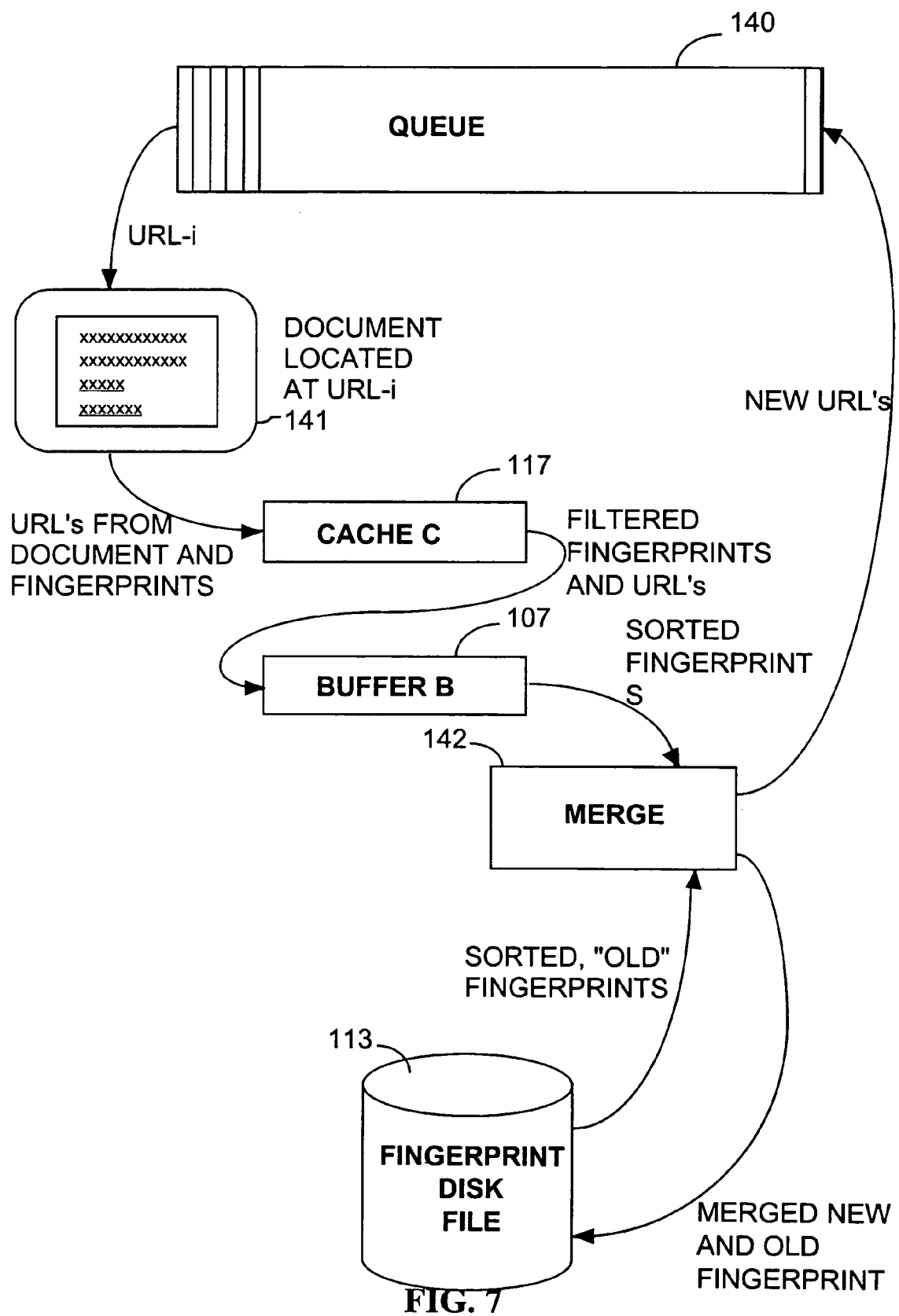
FIG. 7 is a block diagram of the data flow in an alternative embodiment of the invention.

In an alternative embodiment, illustrated in FIG. 7, in addition to buffer B 107, a cache C 117 of "popular" URL's is included. When a URL is removed from the queue 140 and the corresponding web page 141 is downloaded, the fingerprint for each URL extracted from the web page 141 is first compared to fingerprints in cache C 117, to see whether the URL is a "popular" URL that has already been downloaded and therefore need not be processed any further. If the fingerprint is not in cache C 117, the address filter then goes on to compare the fingerprint to the fingerprints in buffer B 107, as discussed previously. Use of the cache C 117 significantly reduces the rate at which the buffer B 107 is filled with fingerprints, which reduces the frequency of merges with the disk file and thus improves the efficiency of the address filter.

The cache C is updated according to an update policy. When, according to the update policy, a new fingerprint must be added to cache C, and cache C 117 is full, a fingerprint is evicted from cache C 117. The fingerprint to be evicted at any one time is determined using an appropriate eviction policy, such as a least recently used eviction policy a round robin eviction policy or a clock replacement eviction policy.

A new fingerprint is added to cache C 117 according to one of the following update policies. A fingerprint corresponding to a URL may be added to cache C 117, following the comparison of the fingerprint to the contents of cache C 117, whenever that fingerprint is not already contained in cache C 117. Thus, under this update policy, cache C 117 is simply a cache of fingerprints for recently-identified URL's. Alternatively, a fingerprint may be added to cache C 117 following the comparison of a fingerprint to the contents of buffer B 107 whenever that fingerprint is not contained in cache C 117, but is contained in buffer B 107. In this case, cache C 117 is a cache of fingerprints for URL's which have been identified more than once recently. Or, a fingerprint may be added to cache C whenever that fingerprint is not contained in cache C 117 and is not contained in buffer B 107. Cache C 117 in this case is a cache of fingerprints for URL's which have been identified only once recently. Finally, a fingerprint may be added to cache C 117 during the merge when the fingerprint is found to have previously existed in the fingerprint disk file 113. For this policy, cache C 117 is a cache of fingerprints for URL's which have been identified more than once during the entire web crawl.

Experiments conducted using these various update policies indicate that the policies yield comparable results, with the last-mentioned policy providing marginally better results than the other three. Each policy has a corresponding "miss rate"—a fraction of fingerprints compared against buffer B 107 following the comparison with cache C 117—of close to 30%. That is, about 70% of all the fingerprints that would have been compared against the buffer B 107 were instead discarded after a comparison with cache C 117 indicated that the fingerprints were old. Obviously, this reduction in fingerprints compared against, and potentially stored in, buffer B 107 reduces the frequency with which buffer B 107 must be merged 142 with the fingerprint disk file 113, and thus increases the efficiency of the address filter.

Figure 8:
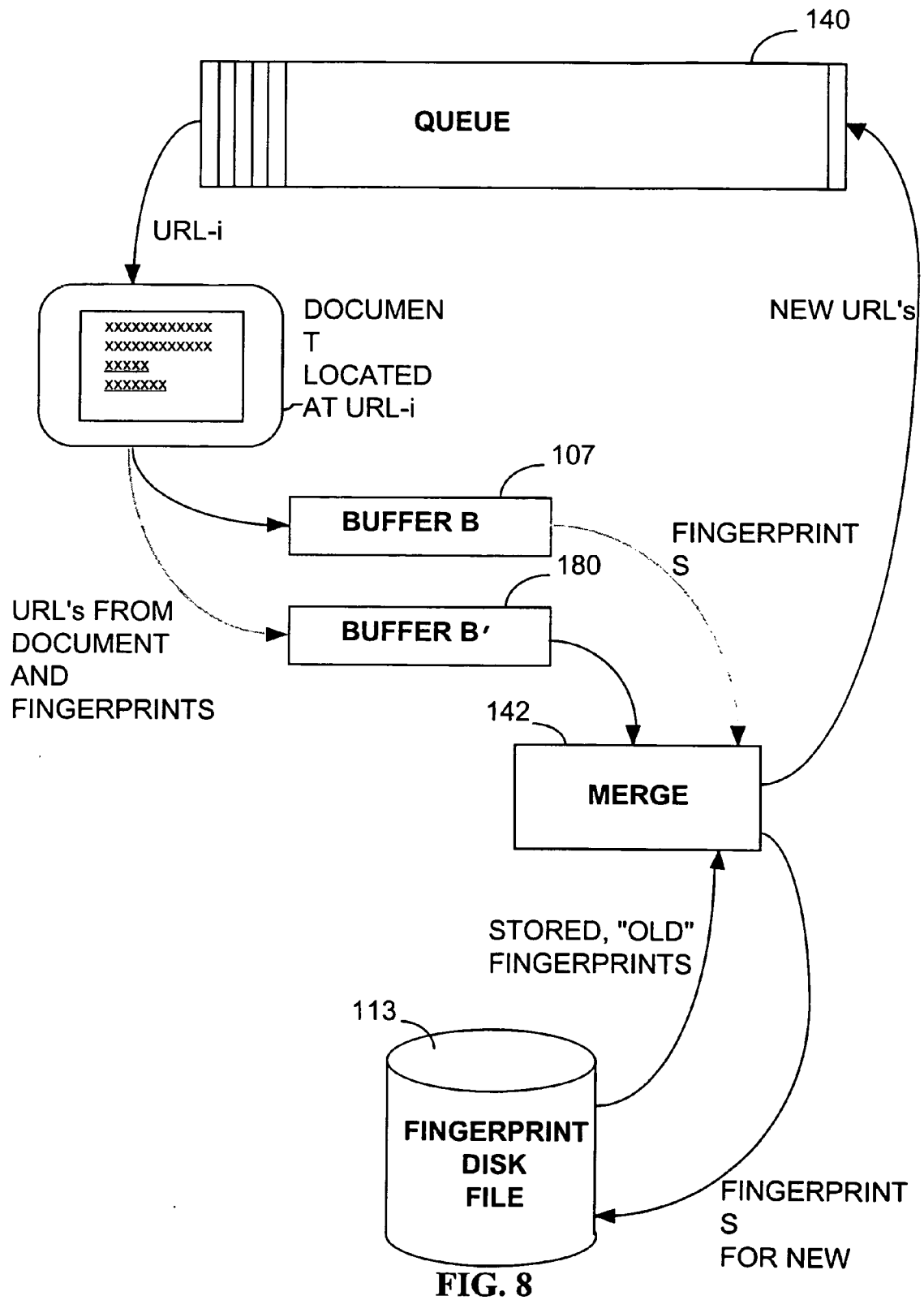
FIG. 8 is a block diagram of the data flow in an alternative embodiment of the invention.

Another alternative embodiment is illustrated in FIG. 8. When buffer B 107 is full, it must be merged 142 with the fingerprint disk file 113, and cannot accept any newly-identified URL's. Hence, no new address cache accepted for filtering while the time-consuming merge process is in progress. To avoid delaying the address filtering procedure during the merge process, the address filter uses a second buffer B' 180 in addition to the buffer B 107. While buffer B 107 is being merged with the disk file 113, buffer B' 180 takes over the role of buffer B 107. Fingerprints for newly-identified URL's are compared with the contents of buffer B' 180 and then stored in buffer B' 180 if it is determined that the fingerprints are not already stored in buffer B' 180. When buffer B' 180 is full, the two buffers change roles again.

The cache C 117 of the embodiment in FIG. 7 can also be used in the embodiment shown in FIG. 8. The addition of cache C makes use of the buffer B 107/180 more efficient, while the use of two buffer B's 107, 180 greatly reduces the "cost" of the buffer merge operations in terms of the web crawler's ability to process discovered URL's that may or may not be new URL'S.

Figure 9:
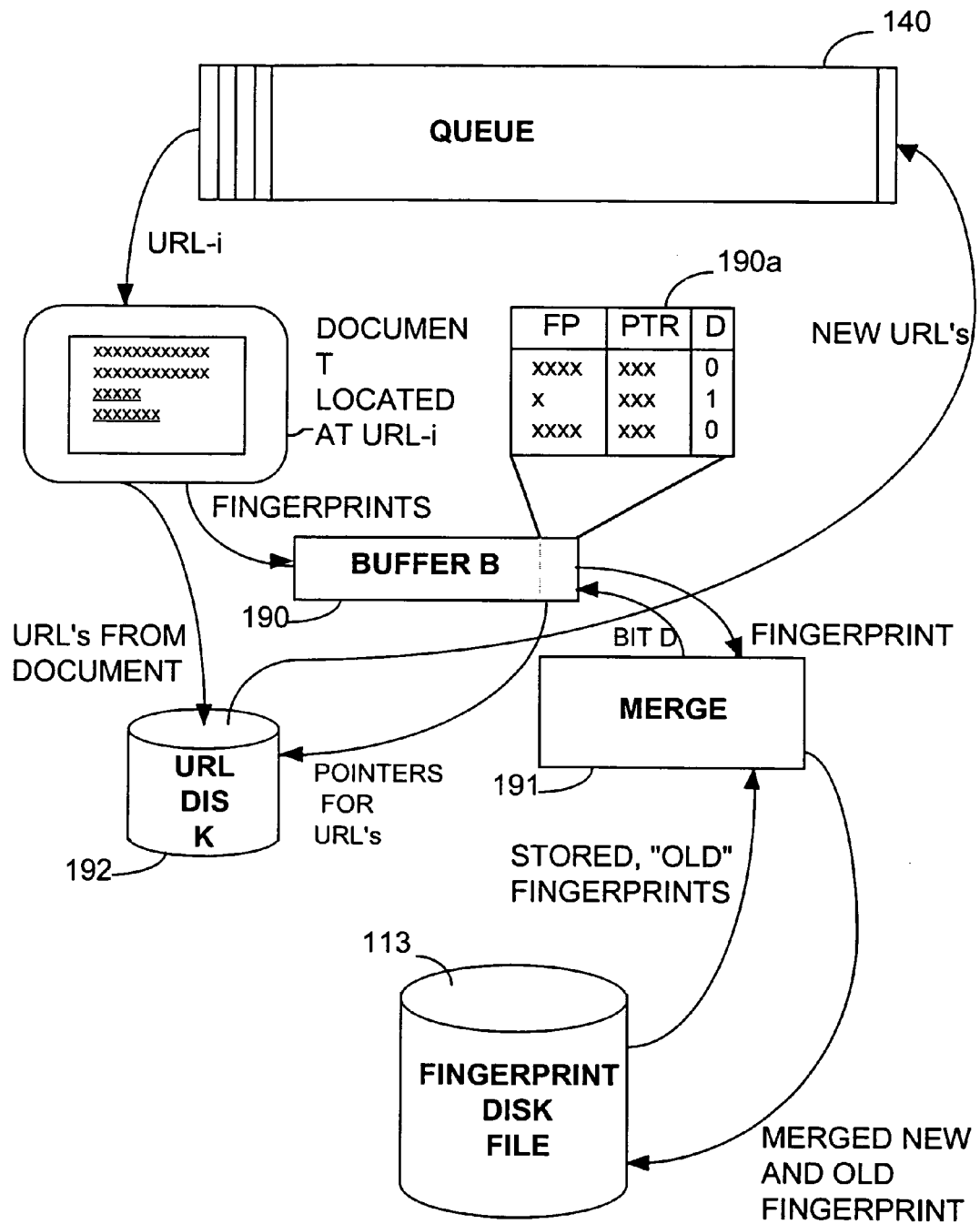
FIG. 9 is a block diagram of the data flow in an alternative embodiment of the invention.
Figure 10:
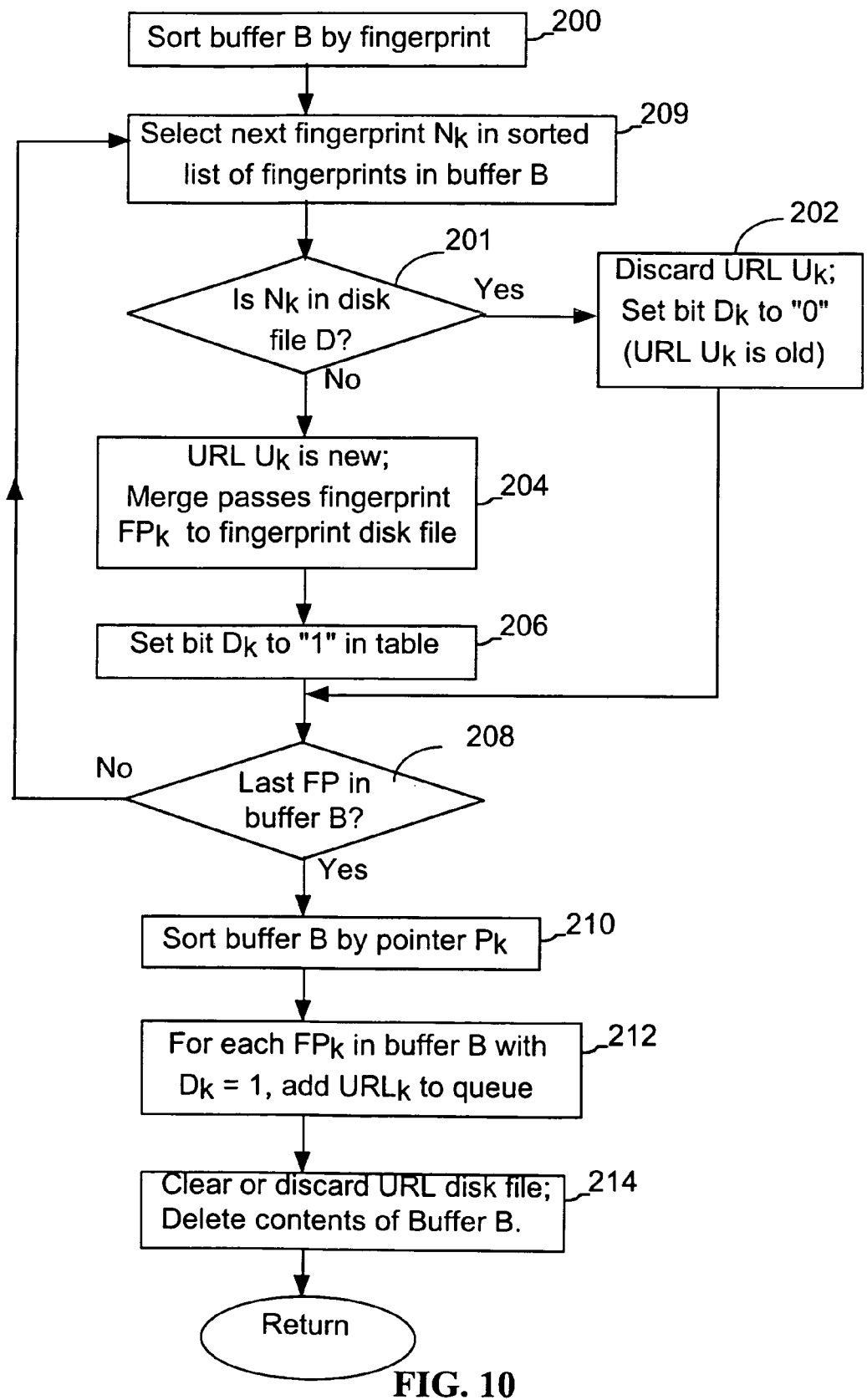
FIG. 10 is a flow chart of the merge process used by the address filtering procedure in an alternative embodiment of the invention.

Yet another alternative embodiment is illustrated in FIG. 9, with the process performed by this embodiment shown in FIG. 10. In this embodiment, instead of storing URL's in buffer B 190, along with their corresponding fingerprints, the URL's are stored in a separate URL disk file 192. In this embodiment, each fingerprint in buffer B 190 includes a pointer to the corresponding URL in the URL disk file 192. The pointer may, for instance, indicate the relative character position of the start of the URL from the start of the URL disk file 192. Alternatively, the pointer may simply indicate the count of the URL in the disk file—the first URL gets pointer 1, the second pointer 2 and so on. In addition, each fingerprint in buffer B 190 will be associated with a flag D.

When the fingerprints are sorted (step 200, FIG. 10) by fingerprint value, at the beginning of the merge 191 (FIG. 9), the pointers must remain associated with their corresponding fingerprints. Pointers and flags may be stored, along with their associated fingerprints, in a table 190a, to facilitate preserving this association. In other words, during the buffer sort operation (step 200), each row of the buffer 190 (i.e., table 190a) is moved as a whole within the buffer to its new position.

As in other embodiments described above, for each fingerprint, the merge process 191 determines whether the fingerprint $N_k$ is in the fingerprint disk file 113 (step 201). If so, the corresponding URL $U_k$ is old, and the fingerprint and URL are discarded, and the flag $D_k$ is set to a first predefined value (e.g., "0") to indicate that the fingerprint is already located in the fingerprint disk file (step 202). If the fingerprint $N_k$ is not in the fingerprint disk file 113, it is new, is added to the fingerprint disk file 113 in step 204, and the flag $D_k$ is set to a second predefined value (e.g., "1") to indicate that the URL $U_k$ needs to be added to the list of URL in the queue 140 (FIG. 9).

After the merge process 191 is complete, buffer B 190 is sorted a second time (step 210), using the pointers as the sort key, and sorting the pointers in, for example, increasing order. Again, each row, consisting of a fingerprint, a pointer, and a flag, is moved as a whole during the sort. After the sort, URL's from the URL disk file are added to the queue. More specifically, for every fingerprint $FP_k$ in the buffer B whose flag $D_k$ is set to the second predefined value ("1"), the URL is added to the queue for downloading (step 212). If flag $D_k$ is not set to the second predefined value, the corresponding URL is not added to the queue. Because the entries in buffer B are sorted in the same order as URL's are stored in the URL disk file, the URL disk file is read sequentially from beginning to end during step 212, which is much more efficient than reading the URL's in the URL disk file in random order. After step 212 is completed, and thus all new URL's in the URL disk file have been added to the queue, the URL disk file is either discarded, in which case a new URL disk file is used for storing the URL's while the buffer is filled again with fingerprints of URL's, or the URL disk file 192 may be cleared for reuse (step 214). In addition, the contents of buffer B are deleted to make buffer B ready for reuse (step 214).

Figure 11:
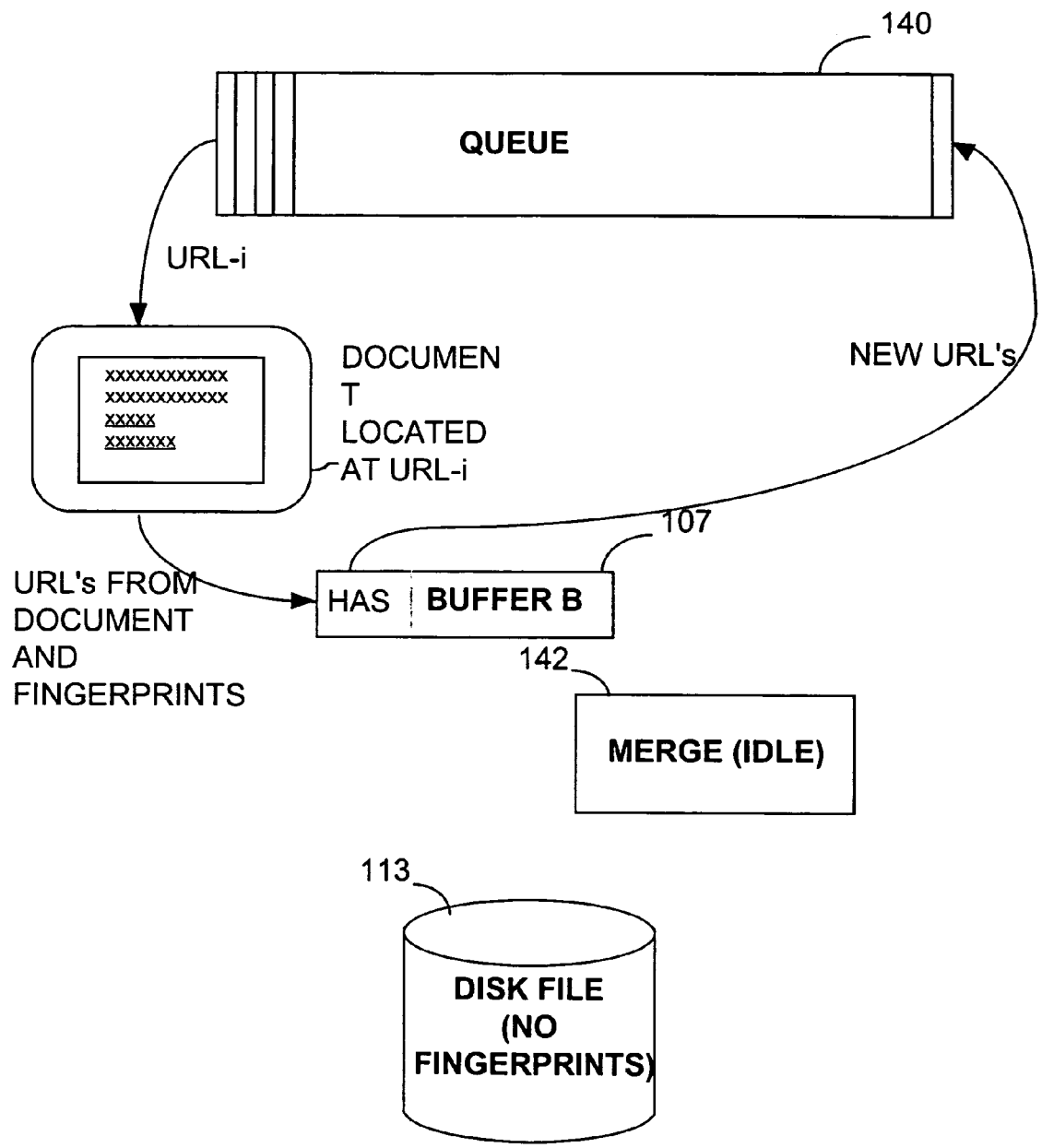
FIG. 11 is a block diagram of the data flow for one aspect of an exemplary embodiment of the invention.

Another aspect of the present invention is illustrated in FIG. 11, where the web crawler has just been initialized and no fingerprints have been stored in the fingerprint disk file. Since there are no "old" URL's, the address filter procedure simply bypasses the merge operation 142 to save processing time. The buffer B 107, which is implemented as a hash table, is searched to see if a newly-identified URL is in buffer B 107. If not, the URL is loaded directly into the queue 140, and the corresponding fingerprint is stored in buffer B 107. When buffer B 107 fills up, all of its fingerprints are written to the fingerprint disk file 113. After the first buffer B of fingerprints has been written to the fingerprint disk file, normal operation of the web crawler, as described above, begins.

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

The foregoing examples illustrate certain exemplary embodiments of the invention from which other embodiments, variations and modifications will be apparent to those skilled in the art. The invention should therefore not be limited to the particular exemplary embodiments discussed herein, but rather defined by the claims appended hereto.

What is claimed is:

1. A method of downloading data sets from among a plurality of host computers, comprising the steps of:
   (a) storing representations of data set addresses in a set of data structures, including a buffer and a first disk file, wherein the representations of data set addresses stored in the first disk file are ordered;
   (b) downloading at least one data set that includes addresses of one or more referred data sets;
   (c) identifying the addresses of the one or more referred data sets;
   (d) for each identified address:
      (d1) generating a representation of the identified address;
      (d2) determining whether the representation is stored in the buffer without determining whether the representation is stored in the first disk file, and when this determination is negative, storing the representation in the buffer; and
   (e) when the buffer reaches a predefined full condition:
      (e1) ordering the contents of the buffer according to the representations;
      (e2) performing an ordered merge of the contents of the buffer into the contents of the first disk file; and
      (e3) preventing duplication of any of the representations of data set addresses stored in the first disk file after the ordered merge.

2. The method of claim 1, further comprising:
   in step (d2), when the determination is negative, storing the identified address in the buffer.

3. The method of claim 1, further comprising:
   in step (d2), when the determination is negative, storing the identified address in a second disk file;
   in step (d2), additionally storing with each representation in the buffer a pointer to the corresponding address stored in the second disk file; and
   in step (e1), while ordering the contents of the buffer, keeping with each representation in the buffer its pointer to the corresponding address in the second disk file.

4. The method of claim 3 wherein
   step (e2) includes: for each representation in the buffer storing an associated flag, setting the flag to a first value when the representation is equal to a representation previously stored in the first disk file, and setting the flag to a second value, distinct from the first value, when the representation is not equal to any representation previously stored in the first disk file; and
   step (e) includes: (e4) for each representation whose flag is set to the second value, scheduling the corresponding data set for downloading.

5. The method of claim 1 wherein:
   step (a), storing representations of data set addresses, includes the step of storing
   representations of data set addresses in a sparse disk file which is divided into portions, each portion having a starting address and contents comprising an ordered list of representations of data addresses; and
   step (e2), merging the contents of the buffer with the ordered contents of the sparse disk file, includes:
   for each of a plurality of the representations stored in the buffer:
      (e2-1) determining a starting address for a corresponding portion of the sparse disk file; and
      (e2-2) performing an ordered merge of a subset of the buffer, starting at the representation for which the starting address was obtained, into the contents of the corresponding portion.

6. The method of claim 1 wherein:
   step (a), storing representations of data set addresses, includes the step of storing representations of data set addresses in a sparse disk file having empty entries interspersed among entries storing said representations; and
   step (e2), merging the contents of the buffer with the ordered contents of the sparse disk file, includes:
   for each respective representation stored in the buffer:
      (e2-1) determining a starting address for a corresponding portion of the sparse disk file; and
      (e2-2) sequentially scanning the disk file, starting at the representation for which the starting address was obtained, until the first of (A) a representation matching the respective representation is found and (B) one of the empty entries is found, and when an empty entry is found storing the respective representation in the empty entry.

7. The method of claim 1 wherein, in step (d1), the representation comprises a checksum of at least a portion of the identified address.

8. The method of claim 1 wherein step (d2) further comprises:
   (d2-1) determining whether the representation is stored in a cache before determining whether the representation is stored in the buffer;
   (d2-2) when the representation is not stored in the cache, the cache has not reached a predefined full condition, and other predefined criteria are met, adding the representation to the cache; and (d2-3) when the representation is not stored in the cache, the cache has reached said predefined full condition, and said other predefined criteria are met, evicting a stored representation from the cache in accordance with an eviction policy and adding the representation to the cache.

9. The method of claim 8 wherein step (e2) further comprises:

when a representation in the buffer is not found in the first disk file during merging, scheduling the corresponding data set for downloading.

10. The method of claim 8 wherein:

step (a), storing representations of data set addresses, includes the step of storing representations of data set addresses in a sparse disk file which is divided into portions, each portion having a starting address and contents comprising an ordered list of representations of data addresses; and step (e2), performing an ordered merge of the contents of the buffer into the contents of the sparse disk file, includes:

for each of a plurality of the representations stored in the buffer:
(e2-1) obtaining a starting address for a corresponding portion of the sparse disk file; and
(e2-2) performing an ordered merge of a subset of the buffer, starting at the
representation for which the starting address was obtained, into the contents of the corresponding portion.

11. The method of claim 8 wherein:

step (a), storing representations of data set addresses, includes the step of storing representations of data set addresses in a sparse disk file having empty entries interspersed among entries storing said representations; and step (e2), merging the contents of the buffer with the ordered contents of the sparse disk file, includes:
for each respective representation stored in the buffer:
(e2-1) determining a starting address for a corresponding portion of the sparse disk file; and
(e2-2) sequentially scanning the disk file, starting at the representation for which the starting address was obtained, until the first of (A) a representation matching the respective representation is found and (B) one of the empty entries is found, and when an empty entry is found storing the respective representation in the empty entry.

12. The method of claim 1 wherein step (e2) further comprises:

when a representation in the first buffer is not found in the first disk file during merging, scheduling the corresponding data set for downloading.

13. A method of downloading data sets from among a plurality of host computers, comprising the steps of:

(a) storing representations of data set addresses in a set of data structures, including a first buffer, a second buffer, and a first disk file, wherein the first disk file contains ordered representations of data set addresses;

(b) selecting as a current buffer one of the first and second buffers;

(c) downloading at least one data set that includes addresses of one or more referred data sets;

(d) identifying the addresses of the one or more referred data sets; and (e) for each identified address:
(e1) generating a representation of the identified address; and
(e2) determining whether the representation is stored in the current buffer without determining whether the representation is stored in the first disk file, and when this determination is negative, storing the representation in the current buffer; and (f) when the current buffer reaches a predefined full condition:
(f1) selecting the other buffer as the current buffer, wherein the previously current buffer is identified as a non-current buffer;
(f2) ordering representations stored in the non-current buffer; and
(f3) performing an ordered merge of the contents of the non-current buffer into the contents of the first disk file wherein the ordered merge comprises preventing duplication of any of the representations of data set addresses stored in the first disk file during or after merging.

14. The method of claim 13, further comprising:

in step (e2), when the determination is negative, storing the identified address in the current buffer.

15. The method of claim 13, further comprising:

in step (e2), when the determination is negative, storing the identified address in a second disk file;

in step (e2), additionally storing with each representation in the current buffer a pointer to the corresponding address stored in the second disk file; and in step (f2), while ordering the contents of the non-current buffer, keeping with each representation in the non-current buffer its pointer to the corresponding address in the second disk file.

16. The method of claim 15 wherein step (e2) comprises: for each representation in the buffer storing an associated flag, setting the flag to a first value when the representation is equal to a representation previously stored in the first disk file, and setting the flag to a second value, distinct from the first value, when the representation is not equal to any representation previously stored in the first disk file; and step (f) includes: (f4) for each representation whose flag is set to the second value, scheduling the corresponding data set for downloading.

17. The method of claim 13 wherein step (e2) further comprises:

when a representation in the current buffer is not found in the first disk file during merging, scheduling the corresponding data set for downloading.

18. The method of claim 13 wherein:

step (a), storing representations of data set addresses, includes storing representations of data set addresses in a sparse disk file which is divided into portions, each portion having a starting address and contents comprising an ordered list of representations of data addresses; and step (e2), performing an ordered merge of the contents of the current buffer into the contents of the sparse disk file, comprises the following steps:

for each of a plurality of the representations stored in the current buffer:
(e2-1) obtaining a starting address for a corresponding portion of the sparse disk file; and
(e2-2) performing an ordered merge of a subset of the current buffer, starting at the representation for which the starting address was obtained, into the contents of the corresponding portion.

19. The method of claim 13 wherein:
step (a), storing representations of data set addresses, includes the step of storing
representations of data set addresses in a sparse disk file having empty entries interspersed among entries storing said representations; and
step (e2), merging the contents of the buffer with the ordered contents of the sparse disk file, includes:
for each respective representation stored in the buffer:
(e2-1) determining a starting address for a corresponding portion of the sparse disk file; and
(e2-2) sequentially scanning the disk file, starting at the representation for which the starting address was obtained, until the first of (A) a representation matching the respective representation is found and (B) one of the empty entries is found, and when an empty entry is found storing the respective representation in the empty entry.

20. The method of claim 13 wherein the representation of the identified address comprises a checksum of at least a portion of the identified address.

21. The method of claim 13 wherein step (e2) further comprises:
(e2-1) determining whether the representation is stored in a cache before determining whether the representation is stored in the current buffer;
(e2-2) when the representation is not stored in the cache, and the cache has not reached a predefined full condition, adding the representation to the cache; and
(e2-3) when the representation is not stored in the cache, and the cache has reached said predefined full condition, evicting a stored representation from the cache in accordance with an eviction policy and adding the representation to the cache.

22. A method of downloading data sets from among a plurality of host computers, comprising the steps of:
(a) storing representations of data set addresses in a set of data structures, including a buffer and a disk file, wherein representations of data set addresses stored in the disk file are ordered;
(b) downloading at least one data set that includes an address of a referred data set;
(c) identifying the address of the referred data set;
(d) generating a representation of the identified address;
(e) determining whether the representation is stored in the buffer, and whether the disk file is empty;
(f) when the representation is not stored in the buffer and the disk file is empty, scheduling the corresponding data set for downloading;
(g) when the representation is not stored in the buffer and the disk file is not empty, storing the representation in the buffer and delaying scheduling of the corresponding data set for downloading until a condition occurs; and
(h) when it is determined that the condition has occurred, performing an ordered merge of contents of the buffer into contents of the first disk file wherein the ordered merge comprises preventing duplication of any of the representations of data set addresses stored in the first disk file during or after merging the contents of the buffer into the contents of the first disk file.

23. A computer program product for use in conjunction with a computer system, the computer program product comprising a computer readable storage medium and a computer program mechanism embedded therein, the computer program mechanism comprising:
a first disk file and a buffer, for storing representations of data set addresses;
a main web crawler module for downloading and processing data sets stored on a plurality of host computers, the main web crawler module identifying addresses of one or more referred data sets in the downloaded data sets; and
an address filtering module for processing a specified one of the identified addresses;
the address filtering module including instructions for:
generating a representation of the identified address;
determining whether the representation is stored in the buffer without determining whether the representation is stored in the first disk file, and when this determination is negative storing the representation in the buffer; and
determining whether the buffer has reached a predefined full condition, and when this determination is positive, ordering the contents of the buffer and then performing an ordered merge of contents of the buffer into the contents of the first disk file wherein the ordered merge comprises preventing duplication of any of the representations of data set addresses stored in the first disk file during or after merging the contents of the buffer into the contents of the first disk file.

24. The computer program product of claim 23, wherein the address filtering module further includes instructions for storing the identified address in the buffer after determining that the representation is not stored in the buffer.

25. The computer program product of claim 23, wherein the address filtering module further includes instructions for:
storing the identified address in a second disk file after determining that the representation is not stored in the buffer; and
storing with each representation in the buffer a pointer to the corresponding address stored in the second disk file; and
during the ordering of the contents of the buffer, keeping with each representation in the buffer its pointer to the corresponding address in the second disk file.

26. The computer program product of claim 23, wherein the first disk file is a sparse disk file divided into portions, each portion having a starting address and contents comprising an ordered list of representations of data addresses; and
the address filtering module includes instructions for performing the ordered merge of the ordered contents of the buffer with the contents of the sparse disk file by obtaining a starting address for a sub-file of the sparse disk file, the portion corresponding to one of the representations in the buffer, and performing an ordered merge of a subset of the representations in the buffer, starting at the one representation, into the contents of the portion.

27. The computer program product of claim 23, wherein the first disk file is a sparse disk file having empty entries interspersed among entries storing said representations of data addresses; and
the address filtering module includes instructions for performing the ordered merge of the ordered contents of the buffer with the contents of the sparse disk file by obtaining a starting address corresponding to each respective representations in the buffer, and sequentially scanning the first disk file, starting at the starting address, until the first of (A) a representation matching the respective representation is found and (B) one of the empty entries is found, and when an empty entry is found storing the respective representation in the empty entry.

28. The computer program product of claim 23 wherein the representation of the identified address comprises a checksum of at least a portion of the identified address.

29. The computer program product of claim 23, wherein the address filtering module further includes instructions for first determining whether the representation is stored in a cache, and when the first determination is positive, skipping the determination of whether the representation is stored in the buffer.

30. The computer program product of claim 23, wherein the address filtering module further includes instructions for:
   determining whether the first disk file is empty and whether the representation is stored in the buffer; and
   if the first disk file is empty and the representation is not stored in the buffer, storing the representation in the buffer and scheduling the corresponding data set for downloading.

31. A computer program product for use in conjunction with a computer system, the computer program product comprising a computer readable storage medium and a computer program mechanism embedded therein, the computer program mechanism comprising:
   a first disk file, a first buffer, and a second buffer, for storing representations of data set addresses;
   a main web crawler module for downloading and processing data sets stored on a plurality of host computers, the main web crawler module identifying addresses of the one or more referred data sets in the downloaded data sets; and
   an address filtering module for processing a specified one of the identified addresses; the address filtering module including instructions for:
      identifying one of the first and second buffers as a current buffer;
      generating a representation of the identified address;
      determining whether the representation is stored in the current buffer without determining whether the representation is stored in the first disk file, and when this determination is negative, storing the representation in the current buffer; and
      determining whether the current buffer has reached a predefined full condition, and when this determination is positive, selecting the other buffer as the current buffer, wherein the previously current buffer is identified as a non-current buffer, ordering the contents of the non-current buffer and then performing an ordered merge of the contents of the non-current buffer into the contents of the first disk file wherein the ordered merge comprises preventing duplication of any of the representations of data set addresses stored in the first disk file during or after merging the contents of the buffer into the contents of the first disk file.

32. The computer program product of claim 31, wherein the address filtering module further includes instructions for storing the identified address in the current buffer after determining that the representation is not stored in the current buffer.

33. The computer program product of claim 31, wherein the address filtering module further includes instructions for:
   storing the identified address in a second disk file after determining that the representation is not stored in the current buffer;
   storing with each representation in the current buffer a pointer to the corresponding address stored in the second disk file; and
   during the ordering of the contents of the non-current buffer, keeping with each representation in the non-current buffer its pointer to the corresponding address in the second disk file.

34. The computer program product of claim 31, wherein the first disk file is a sparse disk file divided into sub-files, each sub-file having a starting address and contents comprising an ordered list of representations of data addresses; and
   the instructions for performing the ordered merge including instructions for obtaining a starting address for a sub-file of the first disk file, the sub-file corresponding to one of the representations in the buffer, and performing an ordered merge of a subset of the representations in the non-current buffer, starting at the one representation, into the contents of the sub-file.

35. The computer program product of claim 31, wherein the first disk file is a sparse disk file having empty entries interspersed among entries storing said representations of data addresses; and
   the address filtering module includes instructions for performing the ordered merge of the ordered contents of the buffer with the contents of the sparse disk file by obtaining a starting address corresponding to each respective representations in the buffer, and sequentially scanning the first disk file, starting at the starting address, until the first of (A) a representation matching the respective representation is found and (B) one of the empty entries is found, and when an empty entry is found storing the respective representation in the empty entry.

36. The computer program product of claim 31 wherein the representation of the identified address comprises a checksum of at least a portion of the identified address.

37. The computer program product of claim 31, wherein the address filtering module further includes instructions for:
   determining whether the first disk file is empty and whether the representation is stored in the current buffer; and
   if the first disk file is empty and the representation is not stored in the current buffer, storing the representation in the current buffer and scheduling the corresponding data set for downloading.

38. A web crawler for downloading data set addresses from among a plurality of host computers, comprising:
   a first disk file and a buffer, for storing representations of data set addresses;
   a main web crawler module for downloading and processing data sets stored on a plurality of host computers, the main web crawler module identifying addresses of the one or more referred data sets in the downloaded data sets; and
   an address filtering module for processing a specified one of the identified addresses; the address filtering module including instructions for:
      generating a representation of the identified address;
      determining whether the representation is stored in the buffer without determining whether the representation is stored in the first disk file, and when this determination is negative storing the representation in the buffer; and
      determining whether the buffer has reached a predefined full condition, and when this determination is positive, ordering the contents of the buffer and then performing an ordered merge of the contents of the buffer into the contents of the first disk file wherein the ordered merge comprises preventing duplication of any of the representations of data set addresses stored in the first disk file during or after merging the contents of the buffer into the contents of the first disk file.

39. The web crawler of claim 38, wherein the address filtering module further includes instructions for storing the identified address in the buffer following a determination that the representation is not stored in the buffer.

40. The web crawler of claim 38, wherein the address filtering module further includes instructions for:
storing the identified address in a second disk file after determining that the representation is not stored in the buffer; and
storing with each representation in the buffer a pointer to the corresponding address stored in the second disk file; and
during the ordering of the contents of the buffer, keeping with each representation in the buffer its pointer to the corresponding address in the second disk file.

41. The web crawler of claim 38 wherein
the first disk file is a sparse disk file divided into portions, each portion having a starting address and contents comprising an ordered list of representations of data addresses; and
the address filtering module further includes instructions for:
obtaining, from an index, a starting address for a portion in the sparse disk file corresponding to one of the representations stored in the buffer; and
performing an ordered merge of a subset of the representations stored in the buffer, starting at the representation for which the starting address was obtained, into the contents of the corresponding portion.

42. The web crawler of claim 38 wherein
the first disk file is a sparse disk file having empty entries interspersed among entries storing said representations of data addresses; and
the address filtering module includes instructions for performing the ordered merge of the ordered contents of the buffer with the contents of the sparse disk file by obtaining a starting address corresponding to each respective representations in the buffer, and sequentially scanning the first disk file, starting at the starting address, until the first of (A) a representation matching the respective representation is found and (B) one of the empty entries is found, and when an empty entry is found storing the respective representation in the empty entry.

43. The web crawler of claim 38 wherein the representation of the identified address comprises a checksum of at least a portion of the identified address.

44. The web crawler of claim 38 wherein the address filtering module further includes instructions for:
determining whether the representation is stored in a cache before determining whether the representation is stored in the buffer, and when this determination is negative, determining whether the representation is stored in the buffer;
when the second determination is negative, storing the representation in the buffer;
when the first determination is negative, and predefined other criteria are met, storing the representation in the cache; and
when the cache has reached a predefined full condition, evicting a stored representation from the cache in accordance with an eviction policy.

45. The web crawler of claim 38 wherein the address filtering module further includes instructions for determining whether the first disk file is empty and whether the representation is stored in the buffer, and if the first disk file is empty and the representation is not stored in the buffer, storing the representation in the buffer and scheduling the corresponding data set for downloading.

46. A web crawler for downloading data set addresses from among a plurality of host computers, comprising:
a first disk file, a first buffer and a second buffer, for storing representations of data set addresses;
a main web crawler module for downloading and processing data sets stored on a plurality of host computers, the main web crawler module identifying addresses of the one or more referred data sets in the downloaded data sets; and
an address filtering module for processing a specified one of the identified addresses; the address filtering module including instructions for:
identifying one of the first and second buffers as a current buffer;
generating a representation of the identified address;
determining whether the representation is stored in the current buffer without determining whether the representation is stored in the first disk file, and when this determination is negative, storing the representation in the current buffer; and
determining whether the current buffer has reached a predefined full condition, and when this determination is positive, selecting the other buffer as the current buffer, wherein the previously current buffer is identified as a non-current buffer, ordering the contents of the non-current buffer and then performing an ordered merge of the contents of the non-current buffer into the contents of the first disk file wherein the ordered merge comprises preventing duplication of any of the representations of data set addresses stored in the first disk file during or after merging the contents of the buffer into the contents of the first disk file.

47. The web crawler of claim 46, wherein the address filtering module further includes instructions for storing the identified address in the current buffer after determining that the representation is not stored in the current buffer.

48. The web crawler of claim 46, wherein the address filtering module further includes instructions for:
storing the identified address in a second disk file after determining that the representation is not stored in the current buffer;
storing with each representation in the current buffer a pointer to the corresponding address stored in the second disk file; and
during the ordering of the contents of the non-current buffer, keeping with each representation in the non-current buffer its pointer to the corresponding address in the second disk file.

49. The web crawler of claim 46, wherein
the first disk file is a sparse disk file divided into sub-files, each sub-file having a starting address and contents comprising an ordered list of representations of data addresses; and
the instructions for performing the ordered merge including instructions for obtaining a starting address for a sub-file of the first disk file, the sub-file corresponding to one of the representations in the buffer, and performing an ordered merge of a subset of the representations in the non-current buffer, starting at the one representation, into the contents of the sub-file.

50. The web crawler of claim 46 wherein
the first disk file is a sparse disk file having empty entries interspersed among entries storing said representations of data addresses; and
the address filtering module includes instructions for performing the ordered merge of the ordered contents of the buffer with the contents of the sparse disk file by obtaining a starting address corresponding to each respective representations in the buffer, and sequentially scanning the first disk file, starting at the starting address, until the first of (A) a representation matching the respective representation is found and (B) one of the empty entries is found, and when an empty entry is found storing the respective representation in the empty entry.

51. The web crawler of claim 46 wherein the representation of the identified address comprises a checksum of at least a portion of the identified address.

52. The web crawler of claim 46, wherein the address filtering module further includes
instructions for: determining whether the first disk file is empty and whether the representation is stored in the current buffer; and
when the first disk file is empty and the representation is not stored in the current buffer, storing the representation in the current buffer and scheduling the corresponding data set for downloading.

53. A method of downloading data sets from among a plurality of host computers, comprising the steps of:
   (a) storing representations of data set addresses in a set of data structures, including a buffer and a first disk file, wherein the representations of data set addresses stored in the first disk file are ordered;
   (b) downloading at least one data set that includes addresses of one or more referred data sets;
   (c) identifying the addresses of the one or more referred data sets;
   (d) for each identified address:
      (d1) generating a representation of the identified address;
      (d2) determining whether the representation is stored in the buffer without determining whether the representation is stored in the first disk file, and when this determination is negative, storing the representation in the buffer; and
   (e) when the buffer reaches a predefined full condition:
      (e1) ordering the contents of the buffer according to the representations;
      (e2) performing an ordered merge of the contents of the buffer into the contents of the first disk file; and
      (e3) preventing duplication of any of the representations of data set addresses stored in the first disk file during the ordered merge.

54. The method of claim 53, further comprising:
in step (d2), when the determination is negative, storing the identified address in the buffer.

55. The method of claim 53, further comprising:
in step (d2), when the determination is negative, storing the identified address in a second disk file;
in step (d2), additionally storing with each representation in the buffer a pointer to the corresponding address stored in the second disk file; and
in step (e1), while ordering the contents of the buffer, keeping with each representation in the buffer its pointer to the corresponding address in the second disk file.

56. The method of claim 55 wherein
step (e2) includes: for each representation in the buffer storing an associated flag, setting the flag to a first value when the representation is equal to a representation previously stored in the first disk file, and setting the flag to a second value, distinct from the first value, when the representation is not equal to any representation previously stored in the first disk file; and
step (e) includes: (e4) for each representation whose flag is set to the second value, scheduling the corresponding data set for downloading.

57. The method of claim 53 wherein:
step (a), storing representations of data set addresses, includes the step of storing
representations of data set addresses in a sparse disk file which is divided into portions, each portion having a starting address and contents comprising an ordered list of representations of data addresses; and
step (e2), merging the contents of the buffer with the ordered contents of the sparse disk file, includes:
for each of a plurality of the representations stored in the buffer:
   (e2-1) determining a starting address for a corresponding portion of the sparse disk file; and
   (e2-2) performing an ordered merge of a subset of the buffer, starting at the representation for which the starting address was obtained, into the contents of the corresponding portion.

58. The method of claim 53 wherein:
step (a), storing representations of data set addresses, includes the step of storing representations of data set addresses in a sparse disk file having empty entries interspersed among entries storing said representations; and
step (e2), merging the contents of the buffer with the ordered contents of the sparse disk file, includes:
for each respective representation stored in the buffer:
   (e2-1) determining a starting address for a corresponding portion of the sparse disk file; and
   (e2-2) sequentially scanning the disk file, starting at the representation for which the starting address was obtained, until the first of (A) a representation matching the respective representation is found and (B) one of the empty entries is found, and when an empty entry is found storing the respective representation in the empty entry.

59. The method of claim 53 wherein, in step (d1), the representation comprises a checksum of at least a portion of the identified address.

60. The method of claim 53 wherein step (d2) further comprises:
   (d2-1) determining whether the representation is stored in a cache before determining whether the representation is stored in the buffer;
   (d2-2) when the representation is not stored in the cache, the cache has not reached a predefined full condition, and other predefined criteria are met, adding the representation to the cache; and
   (d2-3) when the representation is not stored in the cache, the cache has reached said predefined full condition, and said other predefined criteria are met, evicting a stored representation from the cache in accordance with an eviction policy and adding the representation to the cache.

61. The method of claim 60 wherein step (e2) further comprises:

when a representation in the buffer is not found in the first disk file during merging, scheduling the corresponding data set for downloading.

62. The method of claim 60 wherein:

step (a), storing representations of data set addresses, includes the step of storing representations of data set addresses in a sparse disk file which is divided into portions, each portion having a starting address and contents comprising an ordered list of representations of data addresses; and step (e2), performing an ordered merge of the contents of the buffer into the contents of the sparse disk file, includes:

for each of a plurality of the representations stored in the buffer:

(e2-1) obtaining a starting address for a corresponding portion of the sparse disk file; and (e2-2) performing an ordered merge of a subset of the buffer, starting at the representation for which the starting address was obtained, into the contents of the corresponding portion.

63. The method of claim 60 wherein:

step (a), storing representations of data set addresses, includes the step of storing representations of data set addresses in a sparse disk file having empty entries interspersed among entries storing said representations; and step (e2), merging the contents of the buffer with the ordered contents of the sparse disk file, includes:

for each respective representation stored in the buffer:

(e2-1) determining a starting address for a corresponding portion of the sparse disk file; and (e2-2) sequentially scanning the disk file, starting at the representation for which the starting address was obtained, until the first of (A) a representation matching the respective representation is found and (B) one of the empty entries is found, and when an empty entry is found storing the respective representation in the empty entry.

64. The method of claim 53 wherein step (e2) further comprises:

when a representation in the first buffer is not found in the first disk file during merging, scheduling the corresponding data set for downloading.

* * * * *